United States Patent [19]

Biber et al.

[11] Patent Number: 4,523,732
[45] Date of Patent: Jun. 18, 1985

[54] ADJUSTABLE STAND FOR OPTICAL OBSERVATION INSTRUMENTS

[75] Inventors: Klaus Biber; Karl Grünvogel, both of Aalen; Ulrich Lemcke, Heidenheim; Heinz Jakubowski; Kurt Schulz, both of Oberkochen, all of Fed. Rep. of Germany

[73] Assignee: Carl-Zeiss-Stiftung, Heidenheim/Brenz, Oberkochen, Fed. Rep. of Germany

[21] Appl. No.: 302,710

[22] Filed: Sep. 16, 1981

[30] Foreign Application Priority Data

Sep. 18, 1980 [DE] Fed. Rep. of Germany ....... 3035165

[51] Int. Cl.³ ............................................... A47F 5/00
[52] U.S. Cl. ................................................. 248/123.1
[58] Field of Search ................. 248/123.1, 574, 280.1, 248/281.1, 585, 586, 587; 33/440, 442

[56] References Cited

U.S. PATENT DOCUMENTS

| | | | |
|---|---|---|---|
| 198,655 | 12/1877 | Meeker | 248/574 |
| 598,105 | 2/1898 | Lind | 248/574 |
| 911,935 | 2/1909 | Baumwart | 248/123.1 |
| 2,967,458 | 1/1961 | Stone | 248/123.1 |
| 3,973,748 | 8/1976 | Nagasaka | 248/123.1 |
| 4,339,100 | 7/1982 | Heller | 248/123.1 |
| 4,344,595 | 8/1982 | Heller | 248/123.1 |

FOREIGN PATENT DOCUMENTS

| | | | |
|---|---|---|---|
| 1405783 | 10/1969 | Fed. Rep. of Germany | 248/574 |
| 659794 | 1/1964 | Italy | 248/421 |

OTHER PUBLICATIONS

Wild Heerbrugg, Ltd., Prospectus "Wild Series M600", M 1600–1e–III.80.

Primary Examiner—William H. Schultz
Assistant Examiner—Robert A. Olson
Attorney, Agent, or Firm—Hopgood, Calimafde, Kalil, Blaustein & Judlowe

[57] ABSTRACT

The invention contemplates a support stand having a weight-compensating four-bar linkage in the form of an elongate parallelogram, for adjustable-elevation support of an observation instrument such as an operation microscope. Weight compensation is achieved by a preloaded spring contained within opposed channels which constitute two elongate members of the linkage and which have nesting side walls to complete the enclosure of the spring, while also accommodating such electrical and optical cable connections as may be needed to communicate between the instrument and the base of the stand.

10 Claims, 8 Drawing Figures

ADJUSTABLE STAND FOR OPTICAL OBSERVATION INSTRUMENTS

BACKGROUND OF THE INVENTION

The present invention relates to an adjustable stand having a stand base, a stand column and a supporting arm for optical observation instruments, particularly operation microscopes, wherein the supporting arm is developed as a four-bar linkage of the parallelogram variety.

Operation microscopes must be moved very precisely, both horizontally and vertically. Accordingly, it is necessary to compensate by a counterweight for the weight of the operation microscope carried by the stand. Since space is very limited at the operating table, a compact, self-contained stand construction is particularly desired.

West German Pat. No. 2,161,396 and West German Pat. No. 2,320,266 disclose adjustable stands for optical observation instruments, wherein a counterweight is used to compensate for the weight of the apparatus. For example, for an apparatus weighing 15 kg, the counterweight must also weigh 15 kg, in order to obtain required sensitivity with the observation instrument. Despite optimum compensation for weight, a very heavy mass must, however, be moved by the user, requiring a greater or lesser amount of displacement depending on the speed of displacement. Furthermore, the compensation weight requires considerable free space for its unimpeded movement. Since the equipment of the instrument differs greatly, depending on its purpose of use and the particular requirements of an operation, the compensating-weight requirements necessarily also differ greatly. Precise compensation for instrument weight therefore places an additional demand on the persons using it.

Prospectus M1600-le-III.80 of Firma Wild of Heerbrugg, Germany, discloses a stand which uses a gas spring for weight compensation. This known stand has the disadvantage that an uncompensated residual moment remains, due to friction on the piston and the piston rod, as a result of which the sensitivity of the instrument is impaired. Furthermore, a gas spring is of an open, bulky construction, which is also undesired at the operating table.

BRIEF STATEMENT OF THE INVENTION

The object of the present invention is to provide a stand with which the differing weights of different supported instruments can be rapidly and easily compensated by operating personnel, while requiring only minimum space and permitting a fine sensitivity adjustment of the instrument. Another object of the invention is to accommodate supply lines (such as electric current leads, optical guides) in such manner as to achieve optimum reliability in operation and to assure no interference with the surgeon. Furthermore, the stand base is to be imparted a shape which combines optimum stability with, if necessary, easy mobility of the stand.

The invention achieves these objects by providing an adjustable spring within the parallelogram, to compensate for the weight of the involved observation instrument.

A closed structural form of the parallelogram is obtained by employing two parallel channels of U-shaped profile. The channels have nested side walls and are displaceable with respect to each other, and they coact to define an enclosure for reception of the supply cables.

Increased reliability in handling is assured by providing an adjustable stop between the U-shaped profiles, to limit vertical movement of the parallelogram.

Supply cables necessary for illuminating the observation instrument, as well as light guides, can be concealed and protected within the stand.

The stand base is advisedly of T-shape, with two rollers on each cross beam and one roller on the longitudinal beam.

The advantages obtained with the invention reside particularly in the possibility of precise horizontal and vertical movements of the observation instrument, and in its closed, compact construction.

DETAILED DESCRIPTION

An illustrative embodiment of the invention will be described in further detail in conjunction with the accompanying drawings, in which.

Figure 1:
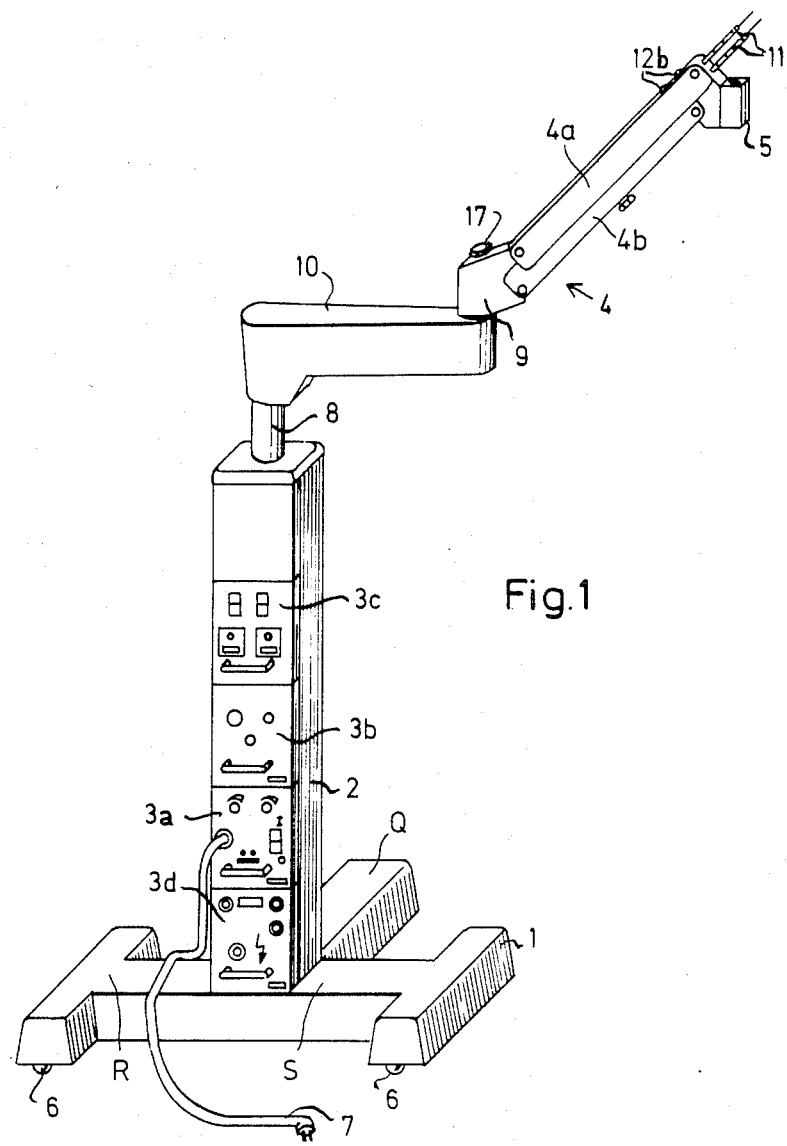
FIG. 1 is an overall view of a stand of the invention, adapted for adjustable-arm support of an observation instrument such as an operation microscope.
Figure 2:
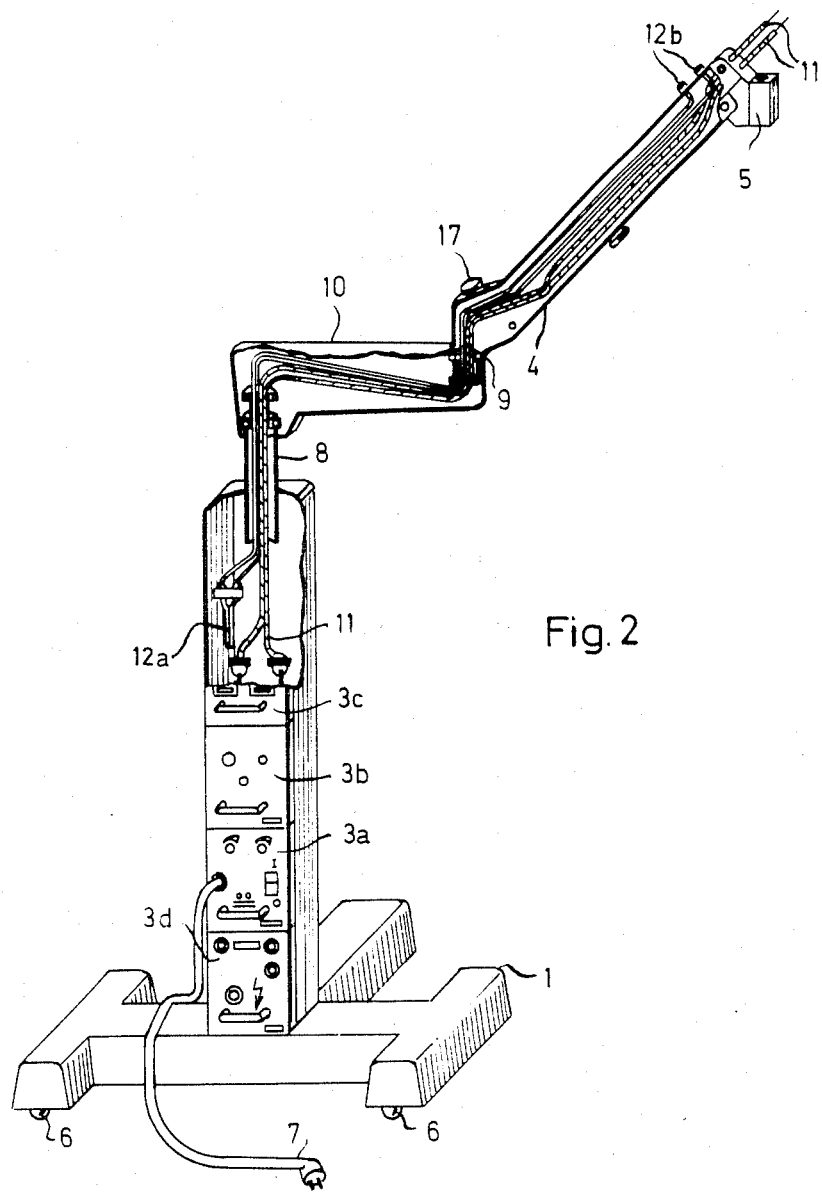
FIG. 2 is a view similar to FIG. 1, but partly broken-away and in partial section to reveal internal features.
Figure 5:
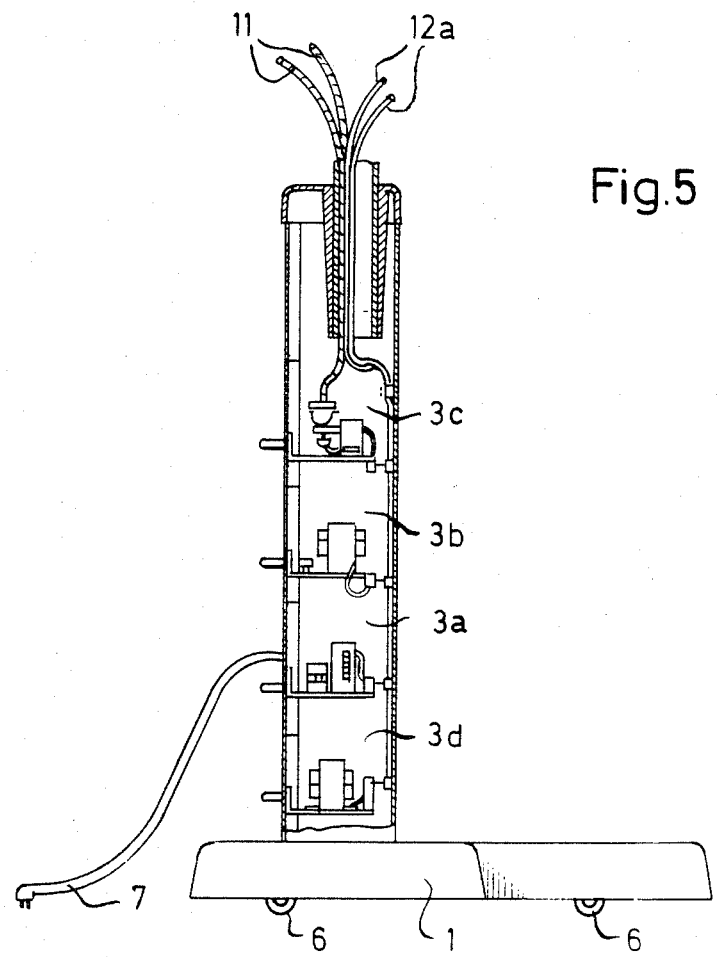
FIG. 5 is a fragmentary view in elevation, partly broken-away and in section through the stand column of the apparatus of FIG. 1.

The compact space-saving construction of the stand can be clearly noted from the overall view shown in FIG. 1, wherein 1 identifies the stand base, 2 the stand column, 3 slide-in units for the supply cables; the base 1 is of generally T shape, comprising a longitudinal beam Q and two transverse beams R, S. and 4 the compensating arm. A mount 5 for the observation instrument used is part of the outer end of arm 4. The inner end of compensating arm 4 is connected (on a vertical pivot axis) via a joint end 9, to a swivel arm 10, mounted for rotation about a vertical pin 8. The illustrative embodiment shown in FIGS. 1, 2 and 5 is provided with a total of four slide-in supply units 3a to 3d. Slide-in unit 3a is for standard equipment; slide-in unit 3b accommodates special instruments, and light guides are supplied by slide-in-unit 3c. The slide-in unit 3d serves for photographic, motion-picture and television adaptation. If fewer slide-in units are required, the free openings can be closed by cover plates. The stand base 1 is shown with floor rollers 6 and is equipped with a flexible power cable 7 and plug. 11 designates light guides, and various sockets 12b are provided for electronic supply of the instrument. An adjustment knob for the compensation spring is designated 17.

In the partial section of FIG. 2, the supply cables are designated 12a. The other designations are the same as in FIG. 1.

Figure 3:
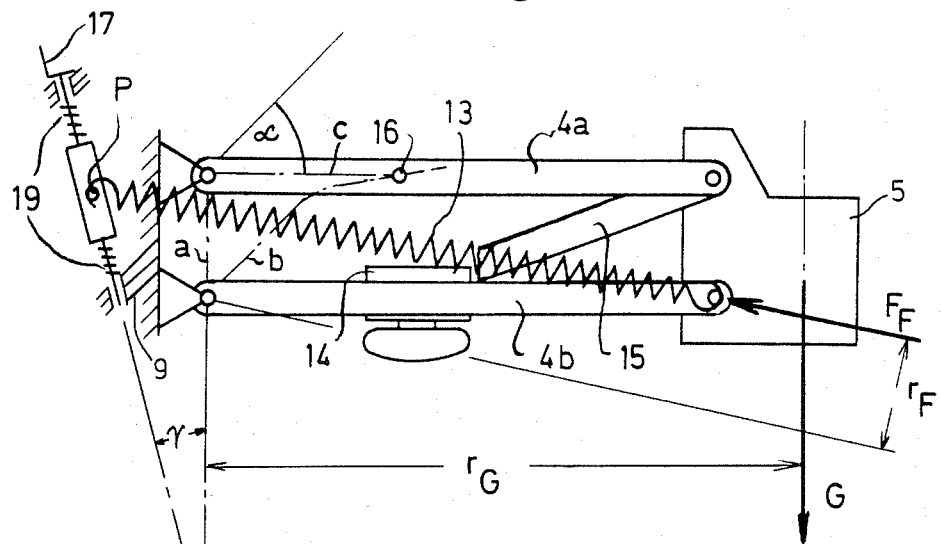
FIG. 3 is a simplified diagram schematically showing components of the adjustable arm of the stand of FIG. 1, and involving an adjustable tension spring to compensate for instrument weight.
Figure 4:
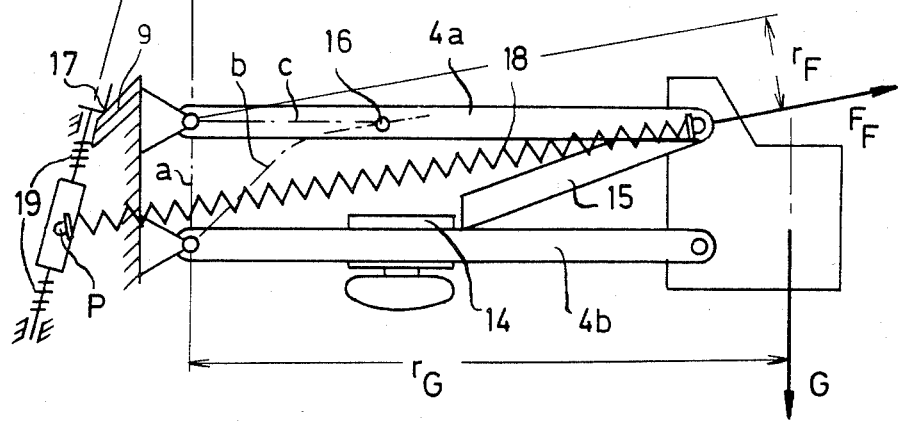
FIG. 4 is a diagram similar to FIG. 3, to show an adjustable arm having a compression spring to compensate for instrument weight.

FIGS. 3 and 4 show alternative spring means to provide adjustability of weight-compensation within the compensating arm 4. In the form of FIG. 3, a tension spring 13 is so arranged within elongate members 4a and 4b (developed as channels with U-shaped profiles) that upon displacement of the reference point P of spring attachment, the product of instrument weight G, times the length of weight arm $r_G$, is equal to the product of spring force $F_F$, times the length of force arm $r_F$, i.e., $$G \times r_G = F_F \times r_F$$

Figure 3A:
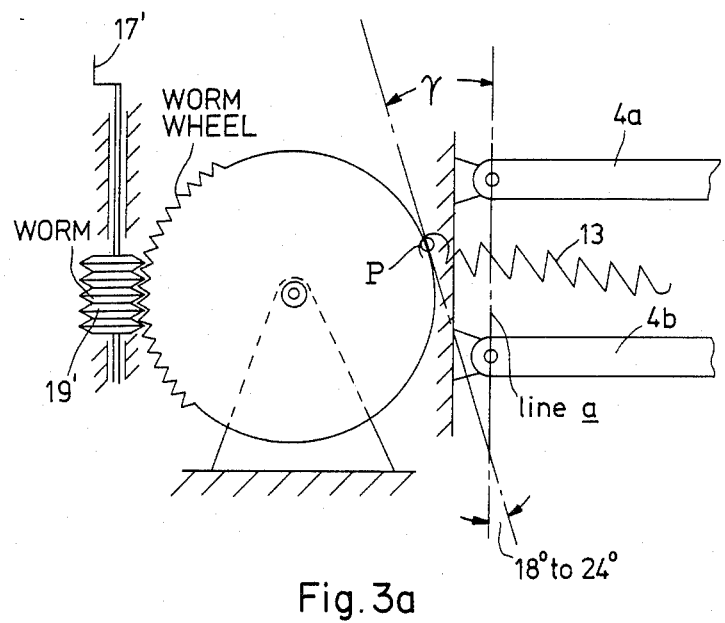
FIG. 3a is a fragmentary diagram similar to FIG. 3, but showing an alternative embodiment.
Figure 3B:
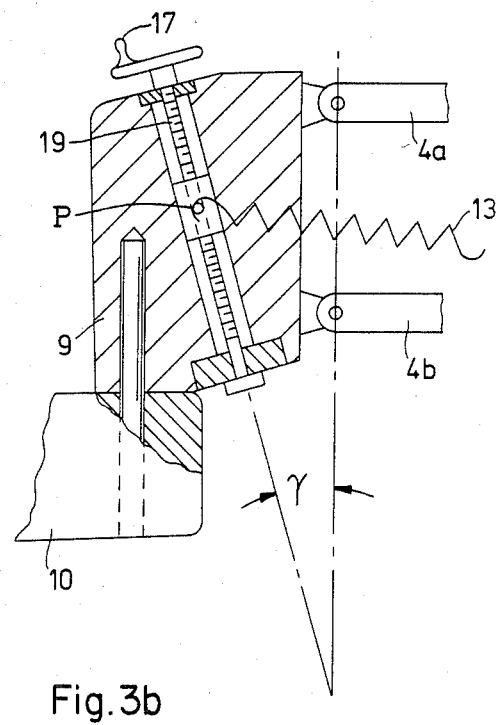
FIG. 3b is a fragmentary vertical section to show further detail for the embodiment of FIG. 3.

For different weights G of the observation instrument, both the spring force $F_F$ and the force arm $r_F$ may be changed by displacement of the reference point P of spring attachment, in such manner that any given weight equalization is sufficiently constant for practical use over an arm-elevation adjustment angle $\pm \alpha$. The locus of point P as a function of compensated weight can be determined by mathematical approximation calculations or empirically. In one advantageous embodiment (as shown in FIG. 3), the locus for P is a straight line which forms an angle $\gamma$ of preferably 18° to 24° with the line a connecting the two points of articulation of the elongate members 4a and 4b; selective displacement of Point P is effected by adjustment knob 17 via a lead screw 19. In another particularly advantageous embodiment (FIG. 3a), the locus for P is developed (by a worm wheel) as a circular arc having a radius of preferably 40 to 60 mm, the tangent at the point P forming an angle $\gamma$ of 18° to 24° with the connecting line a, for the mid-position of elevation of the compensating arm 4, i.e., when $\alpha = 0$. In FIG. 3, selective displacement of point P is effected by adjustment knob 17 via a lead screw 19; in FIG. 3a, selective displacement of point P is effected by adjustment knob 17' via a worm 19'.

In the compensating arm of FIG. 4, a compression spring 18 reacts between the adjustable spring-reference point P and the upper-outer corner of the parallelogram linkage, and the lead screw 19 for adjustment of point P is inclined opposite to the slope discussed for the tension-spring arrangement of FIG. 3. Other parts correspond to those identified in FIG. 3 and have therefore been given the same reference numbers.

It will be understood that FIGS. 3 and 4 are schematic and that for simplicity (i.e., better visibility) the point P of spring-referencing attachment is shown in both cases to be offset to the left of the vertical line a. For a sufficiently large angle of elevation adjustment of arm 4, it is preferred to position the lead-screw action (i.e., locus of point P displaceability) in the vicinity of the connecting line a, using mechanical transmission members (not shown). And particularly precise equalization of weight can be obtained for all angles of adjustment if an additional adjustment means is connected to one of the elongate members 4a or 4b to further control the displacement of point P as a function of the instantaneously selected elevation angle $\alpha$.

It will be seen that the described compensation spring means, be it tension (FIG. 3) or compression (FIG. 4), has the advantage over prior-art use of gas springs, in that it operates virtually free of hysteresis and permits a compact, enclosed construction. The downward stroke may be limited by an adjustable stop 14 against which a swing arm 15 is engageable. The compensating arm 4 is held fast at any desired height by a clamp at 16; in this connection, a bent bar of variable length b is clamped in a triangle with the fixed sides a and c. Within the free space of the compensating arm, i.e., in the volume defined by and between side walls of the opposed channels 4a and 4b, the entire inner cabling, not shown in FIG. 3, is readily accommodated.

It will also be seen that if the involved range of elevation adjustment is limited to relatively small angles, the tension adjustment of spring 13 or the compression adjustment of spring 18 may be accomplished through displacement of point P only in the direction of the axis of the involved spring.

Figure 6:
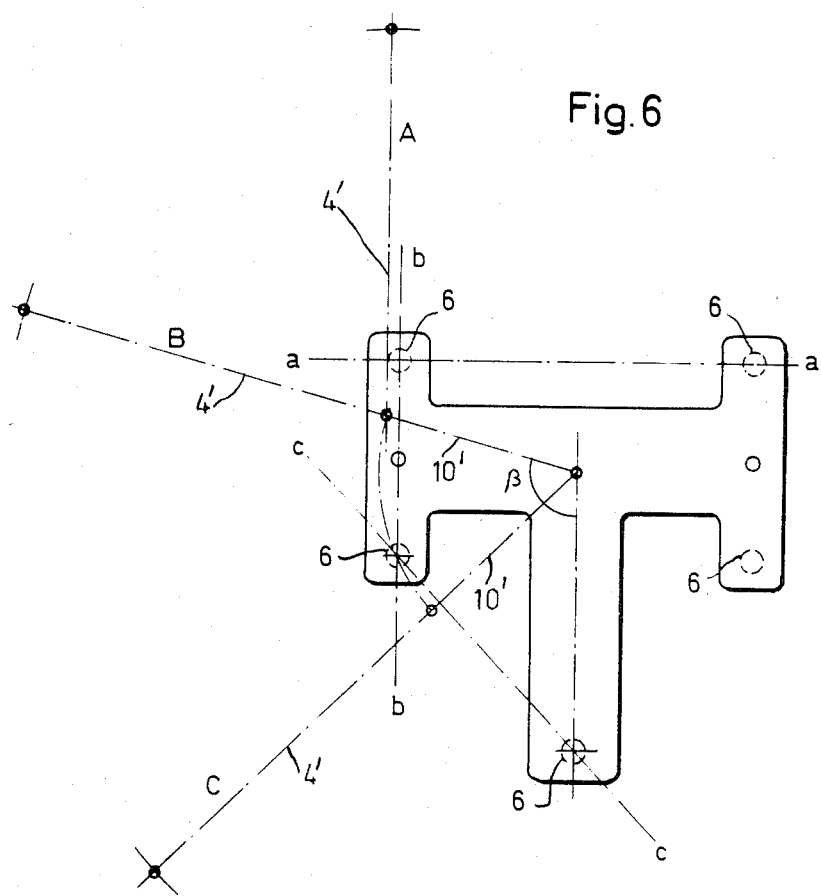
FIG. 6 is a simplified diagram, viewed downwardly at the top of the stand column, to enable discussion of instrument support for various adjusted relationships.

FIG. 5 shows a partial section through the stand column and illustrates full utilization of the column 2, being equipped with four slide-in supply units. And a development of the stand base is shown for assurance of optimum stability, the position of the stand rollers being designated 6, and five rollers being used for the stand base, as shown in FIG. 6. The possible axis of tilt of the stand are designated by aa, bb and cc, and the corresponding extreme orientations 10' and 4' of the swivel arm 10 and of the compensating arm 4 are designated by A, B and C. The angle of rotation of the swivel arm 10 is limited to the angle $\pm \beta$ in order to assure stability.

For expanded possibility of swing and stroke for the operation microscope, a double or multiple scissor arm is possible, two or more of the link parallelograms described working together. The link parallelograms can be connected together rigidly or in articulated manner, as required.

What is claimed is:

1. An adjustable stand having a stand base, a stand column and a support arm for supporting an operation microscope or the like observation instrument, said arm comprising a four-bar linkage establishing a parallelogram wherein (a) a first vertical bar is mounted to said column, (b) a second vertical bar is adapted to support the instrument, and (c) two vertically spaced parallel elongate bars have upper and lower pivoted connections to said vertical bars, spring-anchor means on said first vertical bar and including means for continuously adjustably positioning the same within a limited range of elevations between the elevations of elongate-bar connection thereto, and prestressed spring means connecting said spring-anchor means to said second vertical bar at one to the exclusion of the other of the points of elongate-bar connection to said second vertical bar, whereby said spring means may be essentially fully contained within the geometrical volume generally defined by and between said elongate bars; whereby for a limited range of elongate-bar angular elevation, said spring means may apply a counterbalancing elevational moment to said linkage, such counterbalancing moment varying as a function of elevation angle; and further whereby, within a limited range of weight of an observation instrument mounted to said second vertical bar, an observation instrument of given weight may be counterbalanced by selectively varied adjustment in the elevational position of said spring-anchor means, said spring-anchor means being adjustably displaceable on said first vertical bar along a straight line which forms an angle of 18° to 24° with the line connecting the upper and lower pivoted connections of said elongate bars to said first vertical bar, whereby adjustment of said spring-anchor means effects a change in moment-arm offset with accompanying relatively small change in spring force.

2. An adjustable stand according to claim 1, in which said two vertically spaced elongate bars are channel members having U-shaped profiles, the channel members having nested side walls and being displaceable with respect to each other.

3. An adjustable stand according to claim 2, characterized by the fact that between the U-shaped profiles there is provided an adjustable stop (14) which limits the vertical movement of the U-shaped profiles.

4. An adjustable stand according to claim 2, characterized by the fact that supply cables necessary for the observation instrument as well as optical guides are arranged invisibly within the stand and within the nested channel members of the parallelogram.

5. An adjustable stand according to claim 1, characterized by the fact that the stand base comprises a longitudinal beam with two oppositely directed transverse beams integrally united with one end of the longitudinal beam to thereby define a generally T shape, there being two spaced rollers in each of the transverse beams and one roller in the longitudinal beam at offset from said transverse beams.

6. An adjustable stand having a stand base, a stand column and a supporting arm for supporting an operation microscope or the like observation instrument, said arm comprising a four-bar linkage establishing a parallelogram wherein (a) a first vertical bar is mounted to said column, (b) a second vertical bar is adapted to support the instrument, and (c) two vertically spaced parallel elongate bars have upper and lower pivoted connections to said vertical bars, spring-anchor means at said first vertical bar and including means for continuously adjustably positioning the same within a limited range of elevations between the elevations of elongate-bar connection thereto, and prestressed spring means connecting said spring-anchor means to said second vertical bar at one to the exclusion of the other of the points of elongate-bar connection to said second vertical bar, whereby said spring means may be essentially fully contained within the geometrical volume generally defined by and between said elongate bars; whereby for a limited range of elongate-bar angular elevation, said spring means may apply a counterbalancing elevational moment to said linkage, such counterbalancing moment varying as a function of elevation angle; and further whereby, within a limited range of weight of an observation instrument mounted to said second vertical bar, an observation instrument of given weight may be counterbalanced by selectively varied adjustment in the elevational position of said spring-anchor means; said spring-anchor means being adjustably displaceable along a circular arc having a radius of preferably 40 to 60 mm, the tangent to the circular arc being inclined at an angle of 18° to 24° with the line connecting the upper and lower pivoted connections of said elongate bars to said first vertical bar.

7. An adjustable stand according to claim 6, in which said two vertically spaced elongate bars are channel members having U-shaped profiles, the channel members having nested side walls and being displaceable with respect to each other.

8. An adjustable stand according to claim 7, characterized by the fact that between the U-shaped profiles there is provided an adjustable stop (14) which limits the vertical movement of the U-shaped profiles.

9. An adjustable stand according to claim 7, characterized by the fact that supply cables necessary for the observation instrument as well as optical guides are arranged invisibly within the stand and within the nested channel members of the parallelogram.

10. An adjustable stand according to claim 6, characterized by the fact that the stand base comprises a longitudinal beam with two oppositely directed transverse beams integrally united with one end of the longitudinal beam to thereby define a generally T shape, there being two spaced rollers in each of the transverse beams and one roller in the longitudinal beam at offset from said transverse beams.

* * * * *